March 22, 1966  A. C. VARNER ETAL  3,242,361

HIGH FREQUENCY INDUCTION MOTOR

Filed Sept. 18, 1962

Inventors
Alan C. Varner
Jan E. Haegh
Wilhelm A. Andersen
by Robert B. Benson
Attorney United States Patent Office 3,242,361
Patented Mar. 22, 1966

3,242,361
HIGH FREQUENCY INDUCTION MOTOR
Alan C. Varner and Jan E. Haegh, Cincinnati, Ohio, and Wilhelm A. Andersen, Azusa, Calif., assignors to Allis-Chalmers Manufacturing Company, Milwaukee, Wis.
Filed Sept. 18, 1962, Ser. No. 224,376
1 Claim. (Cl. 310—166)

This invention relates generally to induction motors. More specifically this invention relates to high speed, high frequency induction motors.

It has been found that high frequency, 400 cycle, 2 and 4 pole, induction motors using the die cast, squirrel cage rotor construction of the normal 60 cycle motors often experience acceleration problems and will lock in at 8 to 10 percent of synchronous speed.

The reason why some high frequency induction motors will not accelerate beyond a certain speed, is the combination of harmonic torques and an inherently low pull-up torque. Pull-up torque is the minimum torque that normally occurs between locked rotor and maximum torque. Harmonic torques are a result of an initial deviation from sinusoidal shape of the M.M.F. wave, coupled with reluctance variations due to other physical quantities such as rotor and stator slots.

In certain motor designs, negative harmonic torques may superimpose on the fundamental in such a way that the total motor torque will remain negative over a wide range of speeds. This will prevent the motor from accelerating in this range and hence the motor will run at less than normal speed.

It is known to those skilled in the art that a high degree of magnetic saturation will alter the harmonic content of the M.M.F. wave and so change the harmonic torques. It has been found that 400 cycle motors of the type under discussion will sometimes accelerate when saturated by applying much higher than rated voltages. However, such a high degree of saturation produces intolerably high inrush currents which may damage both the motor and the power supply.

In most 400 cycle applications it is highly uneconomical to maintain rated voltage during the transient starting period, since this requires a well regulated power supply with a capacity of 3 to 7 times the full load motor input. Therefore, aside from the ability to accelerate under rated conditions, it is important that high frequency induction motors be capable of accelerating to rated speed at reduced voltage. Of course, acceleration at reduced voltage must be under no load or at most very slight loads since the torque of an induction motor is reduced by the square of the applied voltage.

Line 26 of FIG. 4 illustrates a typical speed torque curve of a 400 cycle induction motor using the conventional rotor configuration of 60 cycle motors. Obviously the motor will not accelerate beyond the speed at which the torque becomes negative. This negative torque region is a result of the combination of harmonic torques and the inherently low pull-up torque as previously mentioned.

The torque of a motor is approximately inversely proportional to leakage reactance. This is true for harmonic torques as well as fundamental torque. Thus, to reduce the harmonic torques it is necessary to keep the motor leakage reactance high.

Of the various leakage reactances that make up total machine reactance, the one that is most readily controllable by the designer is the rotor zig-zag reactance. This is related to the number of rotor conductors per pole in an inverse manner.

In theory, a low number of rotor conductors will eliminate the negative torque region in the speed torque curve. To check this theory a rotor using a small number of rotor conductors was constructed and tested at 400 cycles. The motor accelerated perfectly and a normal speed torque curve having no negative torque region was obtained. However, a serious defect of this construction is the high zig-zag reactance which reduces the fundamental torque to such an extent that rated torque cannot be achieved.

The object then is to produce a rotor with a small number of conductors to achieve good acceleration characteristics but with low reactance to keep fundamental torques high. The rotor of this invention as illustrated in FIG. 1 achieves this object. The large slots (conductors) provide the low number of conductors for good acceleration and the small slots (not conductors) decrease zig-zag leakage reactance by increasing the Carter factor for the rotor. The reduction of this reactance is sufficient to produce reasonable fundamental torques.

Therefore, it is the object of this invention to provide a new and improved high frequency induction motor.

Another object of this invention is to provide a new and improved rotor for a high frequency induction motor which is capable of accelerating to rated speed at less than rated voltage.

Another object of this invention is to provide a new and improved high frequency induction motor having a better combination of starting and operating characteristics.

Other objects and advantages of this invention will be apparent from the following description when read in connection with the accompanying drawings, in which.

Figure 1:
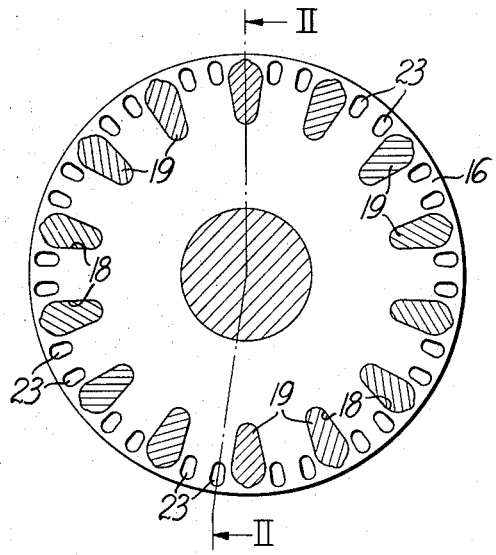
FIG. 1 is a cross section view of the rotor of a high frequency induction motor of this invention.
Figure 3:
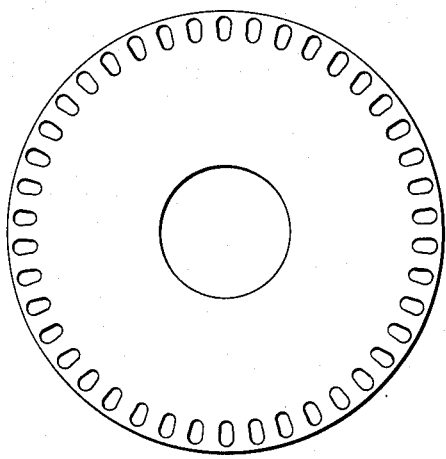
FIG. 3 is an end view of a rotor punching from a standard induction motor.

Referring more particularly to the drawings, the invention is illustrated in connection with an induction motor 10 comprising a conventional stator 11 having windings 12 therein for providing a series of rotating field poles. A rotor 13 is mounted on a shaft, journaled in suitable bearings 14 and positioned within the bore of the stator.

The rotor 13 is made up of a plurality of laminations 16 stacked and joined together to form a cylindrical magnetic core 17. The core is provided with a series of arcuately spaced winding slots 18 which extend the entire length of the core. These winding slots 18 are filled with a nonmagnetic electrically conducting material 19, such as aluminum and interconnected at the ends of the rotor by an annular ring 20 to form a squirrel cage winding 21.

Intermediate adjacent winding slots 18 are longitudinally extending apertures 23. These apertures 23 extend substantially the entire length of the rotor core 17 but are closed at the end of the core by end laminations 24. The end laminations are located at either end of the core and have only the winding slots 18 punched therein. The winding slots 18 in the end laminations 27 are aligned with the winding slots in the other laminations 16 to form a continuous slot through the entire core. However, these end laminations 24 block the apertures 23 and prevent the flow of any aluminum into the apertures 23 when the squirrel cage winding is die cast into the rotor.

Figure 4:
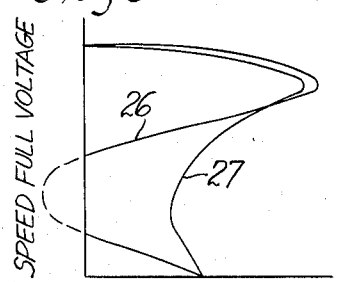
FIG. 4 is a comparison of the speed torque curves of a 400 cycle induction motor with a conventional 60 cycle induction motor rotor and the motor of this invention starting at rated voltage.
Figure 5:
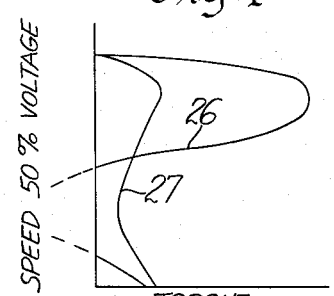
FIG. 5 is a comparison of the speed torque curve of a conventional induction motor and the motor of this invention starting at 50 percent rated voltage.

FIGS. 4 and 5 are speed torque curves comparing the starting characteristics of a 400 cycle induction motor having a conventional 60 cycle induction motor rotor (line 26) and a 400 cycle induction motor (line 27) having a rotor in accordance with this invention. FIG. 4 compares the motors when starting at 100 percent rated voltage while FIG. 5 compares the motors while starting at 50 percent of rated voltage. As shown in FIG. 5, the high frequency induction motor having the conventional rotor is incapable of starting itself because it will not accelerate when the speed torque curve is in the negative region to the left of the vertical ordinate. On the other hand, the motor of this invention can accelerate to rated speed under reduced voltage conditions. It can also be observed from both graphs that the induction motor having the conventional rotor is capable of providing a higher torque at operating speeds than the motor of this invention. However, as it has been pointed out above, there are definite advantages in being able to start a motor at less than rated voltage and still maintain a relatively high torque at operating speeds.

Figure 2:
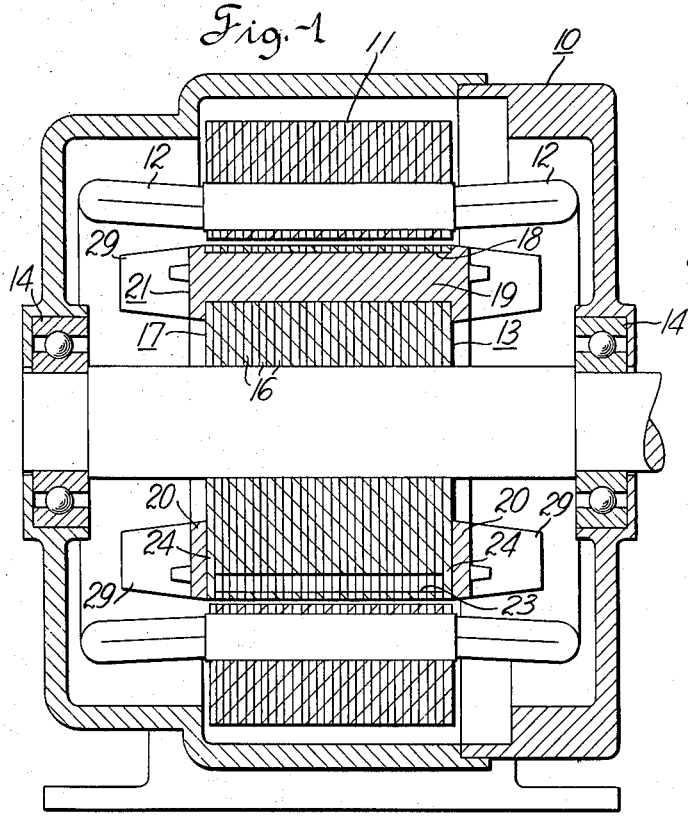
FIG. 2 is a cross section view of a motor of this invention with the view of the rotor taken along line II—II of FIG. 1.

In manufacturing the motor 10 of this invention, laminations 16 having both the winding slots 18 and the intermediate apertures 23 are stacked together to form the core 17. End laminations 24 having only the winding slots 18 are positioned at either end of the core with the winding slots in each of the laminations aligned. All the laminations 16, 24 are then clamped together and positioned in a suitable die. A nonmagnetic, electrically conducting material is poured into the die so as to fill all of the winding slots 18 and form end rings 20 to interconnect the material in the slots at the ends of the rotor and thereby form a squirrel cage winding. As is shown in FIG. 2, fan blades 29 are normally formed integral with the end rings 20 of the rotor to provide ventilation for the motor. The rotor 13 is then assembled into a conventional induction motor stator 11 which is in turn connected to a high frequency, low voltage source of electricity. When the starting switch is closed, the motor accelerates up to rated speed in a manner similar to the curves illustrated in FIGS. 4 and 5 depending, of course, on the voltage across the line at the time the motor is started.

Although but one embodiment of this invention has been illustrated and described, it will be apparent to those skilled in the art that various modifications and changes can be made therein without departing from the spirit of the invention or the scope of the appended claim.

Having now particularly described and ascertained the nature of our said invention and the manner in which it is to be performed, we declare that what we claim is:

A rotor for a high frequency induction motor comprising: a plurality of magnetic laminations stacked to form a cylindrical core, a plurality of arcuately spaced electric conductors extending axially throughout the length of the core, a plurality of axially extending closed top conductor free apertures formed in said core intermediate said electric conductors to decrease zigzag leakage reactance, said conductors and said apertures being radially spaced from the outer surface of said core, and at least one end lamination at each end of said core, said end laminations completely sealing said apertures from the atmosphere and interconnecting the ends of said conductors to form a squirrel cage winding.

References Cited by the Examiner

UNITED STATES PATENTS

| | | | |
|---|---|---|---|
| 919,527 | 4/1909 | Bergman | 310—212 |
| 1,554,702 | 9/1925 | Bergman | 310—211 |
| 1,857,023 | 5/1932 | Hoseason | 310—61 |
| 2,243,021 | 5/1941 | Takenouchi | 310—212 |
| 2,274,070 | 2/1942 | Kanders | 310—212 |
| 2,590,855 | 4/1952 | Gaylord | 310—61 |
| 2,769,108 | 10/1956 | Risch | 310—265 |
| 2,913,607 | 11/1959 | Douglas et al. | 310—261 |
| 2,947,892 | 8/1960 | Inculet et al. | 310—61 X |
| 2,959,694 | 11/1960 | Hutson | 310—61 |
| 3,083,313 | 3/1963 | Boles | 310—212 |
| 3,133,215 | 5/1964 | Porter et al. | 310—61 X |

ORIS L. RADER, *Primary Examiner.*

MILTON O. HIRSHFIELD, *Examiner.*